US006882945B2

(12) United States Patent
Okura et al.

(10) Patent No.: US 6,882,945 B2
(45) Date of Patent: Apr. 19, 2005

(54) METHOD, APPARATUS, AND PROGRAM FOR ESTIMATING NOISE GENERATION FOR A SYNCHRONOUS BELT

(75) Inventors: Kiyoshi Okura, Kobe (JP); Akihiko Tokuda, Kakogawa (JP); Takeshi Murakami, Kobe (JP)

(73) Assignee: Mitsuboshi Belting Ltd., Kobe (JP)

( * ) Notice: Subject to any disclaimer, the term of this patent is extended or adjusted under 35 U.S.C. 154(b) by 69 days.

(21) Appl. No.: 10/374,843

(22) Filed: Feb. 26, 2003

(65) Prior Publication Data

US 2003/0225545 A1 Dec. 4, 2003

(30) Foreign Application Priority Data

Feb. 27, 2002 (JP) .................................... 2002-050863

(51) Int. Cl.[7] .............................................. G01R 29/26
(52) U.S. Cl. ...................................... 702/69; 74/89.22
(58) Field of Search .......................................... 702/69

(56) References Cited

U.S. PATENT DOCUMENTS

| | | | | |
|---|---|---|---|---|
| 3,881,364 A | * | 5/1975 | Rouverol ..................... | 74/462 |
| 4,264,314 A | * | 4/1981 | Imamura ..................... | 474/205 |
| 4,416,649 A | * | 11/1983 | Kohrn ......................... | 474/153 |
| 4,650,445 A | * | 3/1987 | Mott ........................... | 474/201 |
| 4,824,424 A | * | 4/1989 | Ide et al. ..................... | 474/242 |
| 5,405,299 A | * | 4/1995 | Kubo et al. .................. | 474/205 |
| 5,554,807 A | * | 9/1996 | Tranquilla .................... | 73/579 |
| 5,624,337 A | * | 4/1997 | Macchiarulo et al. ....... | 474/205 |
| 5,672,829 A | * | 9/1997 | Tranquilla .................... | 73/579 |
| 5,798,456 A | * | 8/1998 | Tranquilla .................... | 73/579 |
| 5,879,765 A | * | 3/1999 | Marumoto et al. .......... | 428/34.2 |
| 5,940,788 A | * | 8/1999 | Morman et al. ............. | 702/138 |
| 5,969,251 A | * | 10/1999 | Tranquilla .................... | 73/579 |
| 6,511,394 B1 | * | 1/2003 | Okuno et al. ................ | 474/260 |
| 6,568,280 B1 | * | 5/2003 | Park et al. .................... | 73/828 |
| 2002/0035456 A1 | * | 3/2002 | Cremers et al. .............. | 703/5 |
| 2002/0101135 A1 | * | 8/2002 | Giovanardi et al. ......... | 310/328 |

FOREIGN PATENT DOCUMENTS

| | | | | |
|---|---|---|---|---|
| JP | 07332443 A | * | 12/1995 | ............. F16H/7/00 |
| JP | 09049786 A | * | 2/1997 | .......... G01M/13/02 |
| JP | 09133592 A | * | 5/1997 | ............. G01L/5/00 |

OTHER PUBLICATIONS

"Measurement techniques for the acoustic analysis of synchronous belts", Sante et al., May 4, 2000, Meas. Sci. Technol. 11 (2000), pp. 1463–1472.*

Article—A Study on Timing Belt Noise (How to Reduce Resonant Noise), Source: J. Mech. Design, vol. 112, 419–423 (1990).

* cited by examiner

*Primary Examiner*—Marc S. Hoff
*Assistant Examiner*—Anthony Gutierrez
(74) *Attorney, Agent, or Firm*—Wood, Phillips, Katz, Clark & Mortimer (57) ABSTRACT

A method, apparatus, and program for estimating noise generation for a synchronous belt having a length and teeth spaced along the belt length. The method includes the steps of: calculating belt displacement transversely to the belt length at or near a first location at which teeth on the belt mesh with teeth on a first cooperating toothed pulley; calculating a belt fluctuation velocity by correlating the belt displacement to a time frame; and calculating a radiated sound pressure level using the belt fluctuation velocity.

29 Claims, 7 Drawing Sheets

METHOD, APPARATUS, AND PROGRAM FOR ESTIMATING NOISE GENERATION FOR A SYNCHRONOUS BELT

BACKGROUND OF THE INVENTION

1. Field of the Invention

This invention relates to synchronous belts having teeth spaced along the length thereof and, more particularly, to a method, apparatus and program for estimating noise generated by the belt as it meshes with a cooperating, toothed pulley.

2. Background Art

Noise generation by synchronous belts has long been a problem in the various industries in which these belts are utilized. Many studies have been undertaken in which experiments have been performed to investigate the mechanism by which such noise is generated and to investigate alternative structures through which such noise generation can be reduced. Based on these experiments, it has been found that the source of the most significant noise generation is at the location at which the belt teeth mesh with cooperating pulleys. The noise is produced as a result of impacting of (a) the crests of the belt teeth with a cooperating pulley and (b) the pulley teeth with the bottom land region of the belt.

The following system parameters have been considered in studying noise generation and vibration resulting from the operation of synchronous belts: belt tooth profile; material composition and properties of the belt; pulley tooth profile; speed of the pulley; and applied load. However, the noise/vibration analysis has conventionally been carried out by repeated experimentation. Systems are operated with different synchronous belts for which the above parameters are varied. Noise/vibration evaluation is then conducted. Data is generated based on the changed system parameters. Accordingly, data is generated, and improvements are made, on a trial and error basis. This may involve considerable time and expense.

Aside from the fact that repeated experimentation using different system parameters can be time consuming and costly, the inconsistency of experimental setups has often resulted in inconsistent data production relative to a particular pulley and synchronous belt design. Repeatability of test conditions has been difficult, as a result of which the produced data may not be universally applicable in the industry. Further, it is difficult, and potentially very costly in terms of time and expense, to vary all of the above system parameters through repeated testing to achieve an optimum system construction in terms of noise reduction. As a result of these problems, there does not exist a universal understanding in the industry as to how to analyze noise generation in synchronous belt systems and make changes in system parameters to reduce the generated noise. No effective prior art system for analytically estimating the noise properties of synchronous belt systems is known to the applicant.

SUMMARY OF THE INVENTION

In one form, the invention is directed to a method of estimating noise generation for a synchronous belt having a length and teeth spaced along the belt length. The method includes the steps of: calculating belt displacement transversely to the belt length at or near a first location at which teeth on the belt mesh with teeth on a first cooperating toothed pulley; calculating a belt fluctuation velocity by correlating the belt displacement to a time frame; and calculating a radiated sound pressure level using the calculated belt fluctuation velocity.

In one form, the step of calculating belt displacement is performed in a span between the first cooperating toothed pulley and a second toothed pulley spaced from the first cooperating toothed pulley and with which the belt cooperates.

The step of calculating belt displacement may involve calculating belt displacement substantially perpendicular to the length of the belt.

The step of calculating a belt fluctuation velocity may involve calculating a belt fluctuation velocity using at least one of (a) number of revolutions of the first cooperating toothed pulley, (b) number of teeth on the first cooperating toothed pulley, (c) pitch of the teeth on the first cooperating toothed pulley, (d) diameter of the first cooperating toothed pulley, and (e) another parameter of the belt or a system with which the belt cooperates.

The step of calculating belt displacement may involve using a finite element system analysis.

The step of using a finite element system analysis may involve performing a calculation to determine belt displacement based on displacement of a fixed point on the belt substantially perpendicular to the belt length as a portion of the belt at the fixed point moves towards and into a meshing state at the first location.

The invention is also directed to a method of estimating noise generation for a synchronous belt, as described above, and including the steps of: calculating belt displacement transversely to the belt length at or near a first location at which teeth on the belt mesh with teeth on a first cooperating toothed pulley; calculating a belt displacement/fluctuation velocity by correlating the belt displacement to a time frame or frequency; calculating a response displacement or a mode of a belt transverse vibration or a velocity of the belt transverse vibration using the belt displacement/fluctuation velocity taken as a vibrational force at or near the first location; calculating an acoustic radiation efficiency from the calculated response displacement or mode of belt transverse vibration; and calculating a radiated sound pressure level or a radiated acoustic power level from the velocity of the belt transverse vibration and the acoustic radiation efficiency.

The step of calculating belt displacement may involve calculating belt displacement substantially in a span between the first cooperating toothed pulley and a second toothed pulley spaced from the first cooperating toothed pulley and with which the belt cooperates.

The step of calculating belt displacement may involve calculating belt displacement substantially perpendicular to the length of the belt.

The step of calculating a belt displacement/fluctuation velocity may involve calculating a belt displacement/fluctuation velocity using at least one of (a) number of revolutions of the first cooperating toothed pulley, (b) number of teeth on the first cooperating toothed pulley, (c) pitch of the teeth on the first cooperating toothed pulley, (d) diameter of the first cooperating toothed pulley, and (e) parameter of the belt or a system with which the belt cooperates.

The step of calculating belt displacement may involve calculating belt displacement using a finite element system analysis.

In one form, the step of using a finite element system analysis involves performing a calculation to determine belt displacement based on displacement of a fixed point on the belt substantially perpendicular to the belt length as a portion of the belt at the fixed point moves towards and into a meshing state at the first location.

The invention is further directed to a method of estimating noise generation for a synchronous belt, as described above, with the method including the steps of: calculating a radiated sound pressure level using data derived from interaction of the belt teeth with a cooperating toothed pulley at or near a location at which the teeth on the belt mesh with teeth on the cooperating toothed pulley.

The step of calculating a radiated sound pressure level may involve calculating a radiated sound pressure level using data derived based upon displacement of the belt transversely to the length of the belt at or near the location at which the teeth on the belt mesh with teeth on the cooperating toothed pulley.

The method is further directed to an apparatus for estimating noise generation for a synchronous belt having a length and teeth spaced along the belt length. The apparatus has a belt displacement calculator, a fluctuation velocity calculator, and a radiated sound pressure level calculator. The belt displacement calculator is capable of calculating a displacement transverse to the belt length along a span of the belt between which the belt is engaged with first and second cooperating toothed pulleys and at or near a first location at which the teeth on the belt mesh with the first cooperating pulley. The fluctuation calculator is capable of calculating a belt fluctuation velocity based upon belt displacement over a time frame. The radiated sound level calculator is capable of calculating radiated sound pressure level using the calculated fluctuation velocity.

In one form, the fluctuation velocity calculator calculates fluctuation velocity using at least one of (a) number of revolutions of the first cooperating toothed pulley, (b) number of teeth on the first cooperating toothed pulley, (c) pitch of the teeth on the first cooperating toothed pulley, (d) diameter of the first cooperating toothed pulley, and (e) another parameter of the belt or a system with which the belt cooperates.

In one form, the belt displacement calculator calculates belt displacement using a finite element system analysis.

The finite element system analysis may be carried out based upon displacement of a fixed point on the belt substantially perpendicular to the belt length as a portion of the belt at the fixed point moves towards and into a meshing state at the first location.

The invention is further directed to an apparatus for estimating noise generation for a synchronous belt having a length and teeth spaced along the belt length, and including a belt displacement calculator, a belt displacement/fluctuation velocity calculator; a belt transverse vibration calculator, an acoustic radiation efficiency calculator, and a radiated sound pressure level/radiated acoustic power level calculator. The belt displacement calculator is capable of calculating displacement transverse to the belt length along a span of the belt between which the belt is engaged with first and second cooperating toothed pulleys and at or near a first location at which the teeth on the belt mesh with the first cooperating pulley. The displacement/fluctuation velocity calculator is capable of calculating displacement/fluctuation velocity as a function of time or frequency. The belt transverse vibration is capable of calculating a response displacement or a mode of belt transverse vibration or velocity of belt transverse vibration using the calculated displacement/fluctuation velocity taken as a vibrational force at or near the first location. The acoustic radiation efficiency calculator is capable of calculating an acoustic radiation efficiency from the calculated response displacement or mode of belt transverse vibration. The radiated sound pressure level/radiated acoustic power level calculator is capable of calculating a radiated sound pressure level or radiated acoustic power level from the calculated velocity of the belt transverse vibration and acoustic radiation efficiency.

In one form, the displacement/fluctuation velocity calculator calculates displacement/fluctuation velocity using at least one of (a) number of revolutions of the first cooperating toothed pulley, (b) number of teeth on the first cooperating toothed pulley, (c) pitch of the teeth on the first cooperating toothed pulley, (d) diameter of the first cooperating toothed pulley, and (e) another parameter of the belt or a system with which the belt cooperates.

In one form, the belt displacement calculator calculates belt displacement using a finite element system analysis.

The finite element system analysis may be carried out based on displacement of a fixed point on the belt substantially perpendicular to the belt length as a portion of the belt at the fixed point moves towards and into a meshing state at the first location.

The invention is further directed to a program that is usable as a part of the apparatus for estimating noise generation for a synchronous belt, as described above.

DETAILED DESCRIPTION OF THE DRAWINGS

Figure 5:
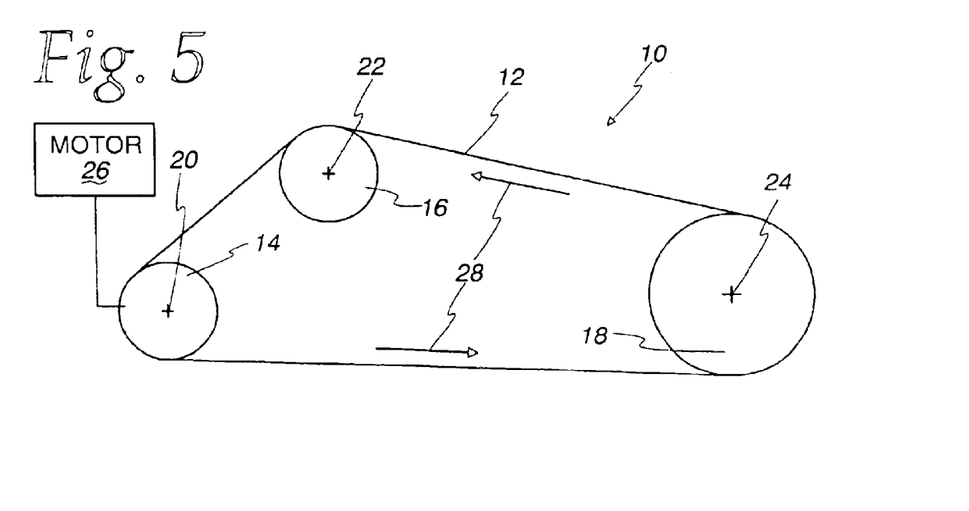
FIG. 5 is a schematic depiction of a representative operating system including a synchronous belt and cooperating tooth pulleys, for which noise generation can be measured, according to the present invention.

Referring initially to FIG. 5, a representative, dynamic operating system, from which noise generation can be estimated according to the present invention, is shown at 10 and consists of a synchronous belt 12 which is trained for movement in an endless path around a toothed drive pulley 14, a toothed idler pulley 16, and a toothed driven pulley 18. The pulleys 14,16,18 are rotatable around spaced, parallel axes 20,22,24, consecutively. The pulleys 14,16,18 each have teeth (not shown in FIG. 5) spaced equidistantly around their respective circumferences. Three separate belt spans are formed between each pulley pair 14,16; 16,18; 18,14. A motor 26 drives the pulley 14 so as to cause the belt 12 to travel in an endless path in a direction indicated by the arrows 28. As a result, each of the pulleys 14,16,18 is driven in a counterclockwise direction around its respective axis 20,22,24.

Figure 6:
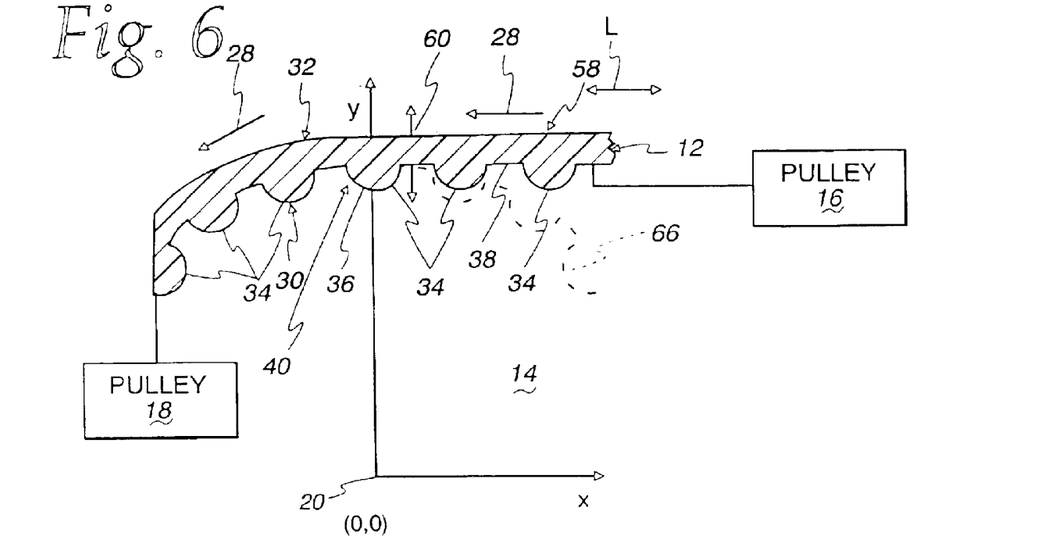
FIG. 6 is an enlarged, fragmentary view of the connection between the synchronous belt in FIG. 5 and one of the tooth pulleys at a location at which the teeth on the belt move into a meshed state with the cooperating pulley and further showing a reference x-y coordinate system for determining displacement of the belt as meshing occurs.

As seen in FIG. 6, the belt 12 has an inside 30 and outside 32, with teeth 34 spaced at regular intervals along the belt length, indicated by the double-headed arrow L, at the inside 30 of the belt 12. The representative teeth 34 each have a substantially circular surface 36. While a circular belt tooth configuration is shown, it should be understood that virtually any other tooth configuration is contemplated i.e. trapezoidal, etc. Land surfaces 38 are formed between adjacent teeth 34.

For purposes of taking distance measurements, an x-y coordinate reference system is superimposed over the pulley and belt combination with the coordinate (0,0) coinciding with the center axis 20 for the pulley 14. In this coordinate system, the y axis extends perpendicular to the length L of the belt 12 as it travels up towards a location at 40 at which the teeth 34 consecutively assume a meshed state with the pulley 14. The x axis extends substantially parallel to the running direction of the belt 12 as portions thereof move up to the location at 40.

Figure 2:
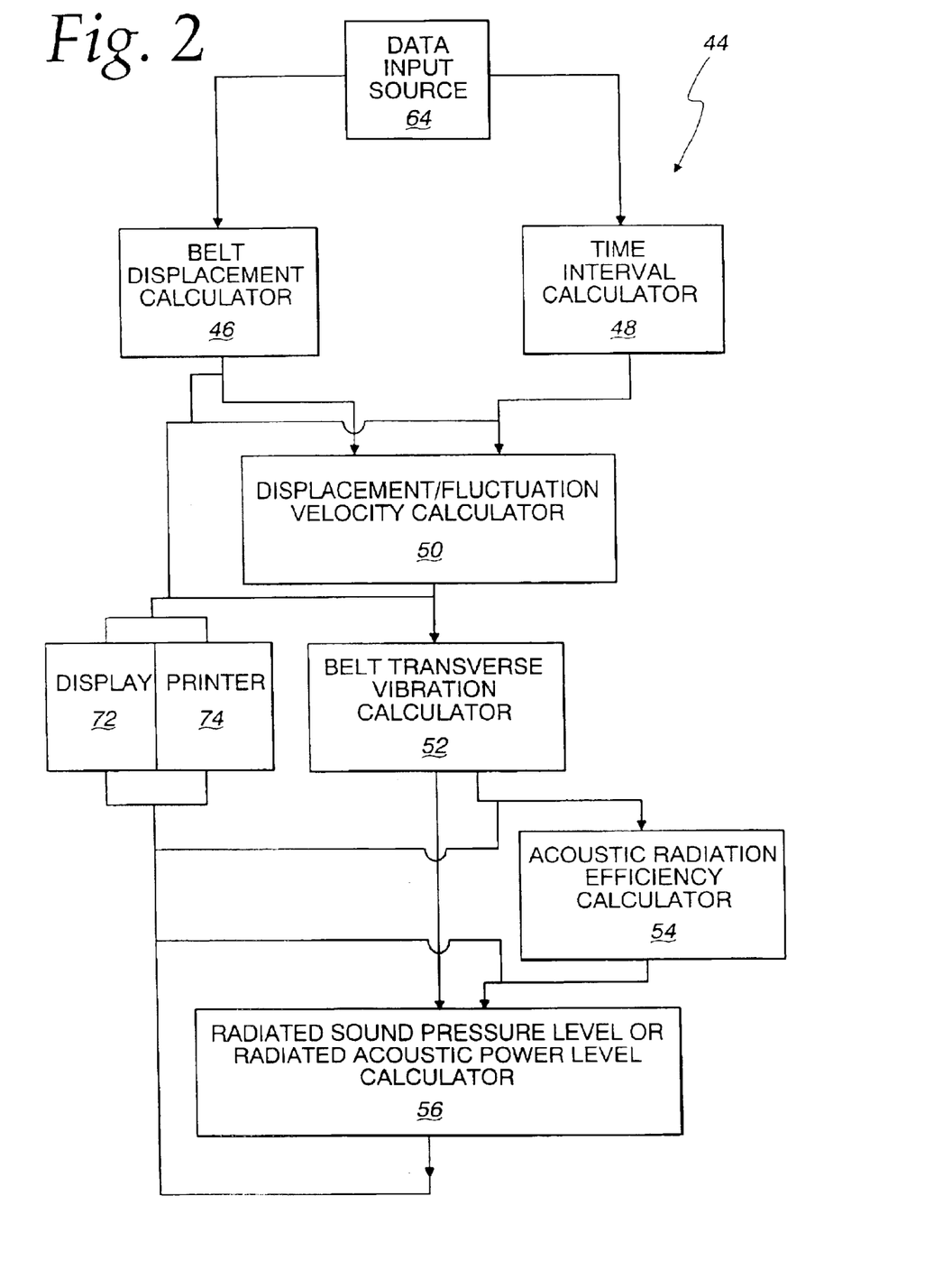
FIG. 2 is a schematic representation of an apparatus through which the method of FIG. 1 can be carried out.

In FIG. 2, one form of apparatus for estimating noise generation for a synchronous belt, according to the present invention, is shown at 44. The apparatus 44 consists of a belt displacement calculator 46, a time interval calculator 48, a displacement/fluctuation velocity calculator 50, a belt transverse vibration calculator 52, an acoustic radiation efficiency calculator 54, and a radiated sound pressure level/radiated acoustic power level calculator 56.

One belt pitch, or a plurality of pitches for the belt 12, are divided into n steps. At each n or (n+1) step (a) the change in position of a fixed point on the belt 12 along the y axis or (b) the change in position of part of the belt in the y direction relative to an x coordinate point fixed near a meshing point as meshing progressively occurs, is determined by the belt displacement calculator 46. The step n is a positive integer.

Figure 7:
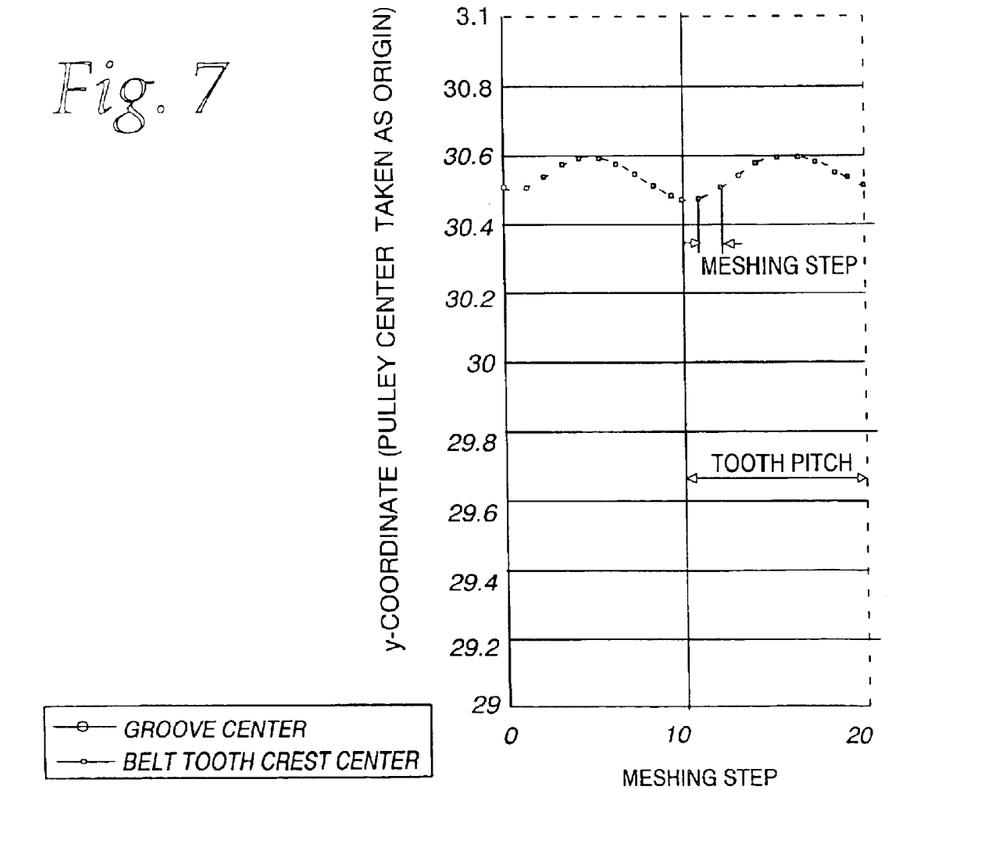
FIG. 7 is graph showing the relationship between a meshing step and the position of the belt along the y reference axis in FIG. 6.

The belt displacement at the meshing location for each step is obtained using a finite element system analysis as a change in the y coordinate position for a fixed point on the belt 12 as the belt 12 progresses towards, and assumes, a meshed state. The point may be on a cord at the center of a tooth crest or at the center of a groove between adjacent teeth. The finite element system analysis is made using the x-y coordinate system, as shown in FIG. 6. In FIG. 6, the belt portion at 58 moving towards the meshed state and parallel to the x axis is put under tension between the pulleys 14,16 along the x axis. No tension is applied in the y direction in FIG. 6. The slack portion of the belt 12 downstream of the pulley 14, moving towards the pulley 18, has a predetermined tension maintained thereon. Using the finite element system analysis, the relationship between the meshing step (n or (n+1)) and the y coordinate position of the point on the belt 12 is determined as the belt 12 is displaced in the direction of the double-headed arrow 60 in FIG. 6, i.e., parallel to the y axis. This relationship is shown in FIG. 7.

As seen in FIG. 2, data from a source 64 is input to the belt displacement calculator 46. The data may be input using a keyboard, or the like. The input data may include pulley diameter D(m), tooth pitch p(m), the number of pulley teeth 64 (FIG. 6), or another parameter of the operating system 10. Additionally, the number of revolutions N (rpm) of the driving pulley 14 is inputted.

The time interval $\Delta t$ (sec) for a single step n is obtained by the time interval calculator 48. The time interval ($\Delta t$) for one step is calculated according to the following formula:

$$\Delta t = (60 \times p)/(N \times \pi \times D \times n) = 60/(N \times Z \times n).$$

Through the displacement/fluctuation velocity calculator 50, using calculated values for belt displacement $\Delta y(m)$ from the belt displacement calculator 46 and the time interval $\Delta t$ for one step calculated by the time interval calculator 48, a change in position along the y axis is determined as a function of time. The fluctuation velocity v(m/sec) in the y direction is calculated as follows, as a function of time:

$$v = \Delta y / \Delta t.$$

In the displacement/fluctuation velocity calculator 50, the belt displacement $\Delta y$ can also be subjected to Fourier transformation to make displacement/fluctuation velocity calculations based on frequency.

Figure 8:
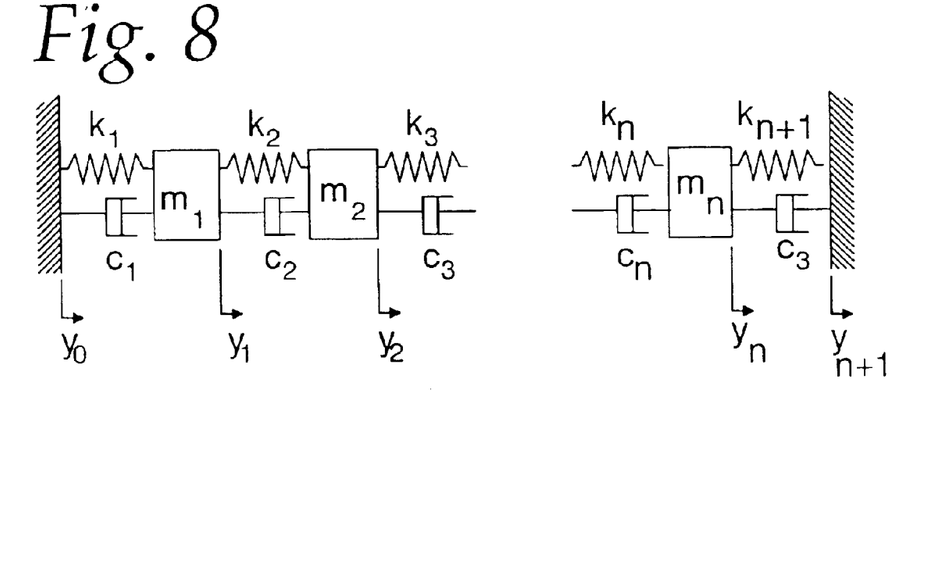
FIG. 8 is a schematic representation of a lumped parameter system, including masses, springs, and dash pots, which replace the synchronous belt.

The belt transverse vibration calculator 52 determines the response displacement of the belt transverse vibration and a mode thereof from the displacement in the y direction determined by the displacement/fluctuation velocity calculator 50 using as a boundary condition a vibrating force at the meshing end of the belt span. To accomplish this, the belt 12 is replaced by a lumped parameter system including masses, springs, and dash pots, as shown in FIG. 8. Using the following calculation, response displacement and a mode at each point on the belt may be obtained, as by using a finite element system analysis.

$$\{u\} = [A]^{-1} * \{f\}$$

$$[A] = [k] + j\omega[c] - \omega^2[m]$$

$$[k] = \begin{bmatrix} k_1 + k_2 & -k_2 & & & & \\ -k_2 & k_2 + k_3 & -k_3 & & & \\ & \ddots & \ddots & \ddots & & \\ & & -k_1 & k_1 + k_{i+1} & -k_{i+1} & \\ & & & \ddots & \ddots & \ddots \\ & & & & -k_n & k_n + k_{n+1} \end{bmatrix}$$

$$[k] = \begin{bmatrix} c_1 + c_2 & -c_2 & & & & \\ -c_2 & c_2 + c_3 & -c_3 & & & \\ & \ddots & \ddots & \ddots & & \\ & & -c_1 & c_1 + c_{i+1} & -c_{i+1} & \\ & & & \ddots & \ddots & \ddots \\ & & & & -c_n & c_n + c_{n+1} \end{bmatrix}$$

-continued $$[m] = \begin{bmatrix} m_1 & & & & & \\ & m_2 & & & & \\ & & \ddots & & & \\ & & & m_i & & \\ & & & & \ddots & \\ & & & & & m_n \end{bmatrix}$$

$$\{u\} = \begin{bmatrix} u_1 \\ u_2 \\ \vdots \\ u_i \\ \vdots \\ u_n \end{bmatrix}$$

$$\{f\} = \begin{bmatrix} (k_1 + j\omega c_1)Y_0 \\ 0 \\ \vdots \\ 0 \\ \vdots \\ (k_{n+1} j\omega c_{n+1})Y_{n+1} \end{bmatrix}$$

where:
 $\omega$ is an angular frequency of an exciting force,
 [k] is a stiffness matrix,
 [c] is a damping matrix,
 [m] is a mass matrix,
 $\{u\}$ is a mode vector,
 $\{f\}$ is an external force vector, and
 $Y_0$ and $Y_{n+1}$ are displacement amplitudes at both ends of the belt.

Through the acoustic radiation efficiency calculator 54, an acoustic radiation efficiency due to the belt vibration is obtained from the vibrating mode $\{u\}$ obtained through the belt transverse vibration calculator 52 as a displacement of each point (mass) on the belt to the vibrating angular frequency ($\omega$) and a belt size (a span length l(m) and a width b(m)). When a frequency less than or equal to a first order eigen value of the transverse vibration is desired, an acoustic radiation efficiency $\sigma$ is obtained by the following calculation, using the assumption that the belt is, for example, a circular piston with a radius a(m) having an area equivalent thereto and placed in free space.

$$\sigma = \frac{0.1886}{\pi}(ka)^4 \,(ka \leq 2)$$
$$= 2 \,(ka > 2)$$
$$k = \frac{\omega}{c} = \frac{2\pi f}{c}$$
$$a = \sqrt{\frac{bl}{\pi}}$$

where:
 f is a frequency ($=\omega/2\pi$), and
 c is the speed of sound in air.

To more precisely obtain the acoustic radiation efficiency $\sigma$, instead of the above method, the efficiency can be analytically obtained by using a boundary element method or experimentally obtained.

Through the radiated sound pressure level/radiated acoustic power level calculator 56, a radiated acoustic power level or a radiated sound pressure level is calculated according to the following equation, using the velocity of the belt transfer vibration obtained through the belt transverse vibration calculator 52 and the acoustic radiation efficiency obtained through the acoustic radiation efficiency calculator 54.

Radiated acoustic power level:

$$L_W = \overline{L_v} + 10\log S + 10\log \sigma$$

Belt surface radiated sound pressure level:

$$L_P = \overline{L_v} + 10\log \sigma$$

where:

$$\overline{L_v} = 10 \log \overline{v_e}^2/(5 \times 10^{-8})^2,$$

$\overline{v_e}^2$ is a time and space averaged value of square belt vibration velocity,
 S is the surface area of the belt (=belt width×span length), and
 $\sigma$ is the acoustic radiation efficiency of the belt.

The apparatus 44 may be a personal computer (PC), including hardware such as a CPU, ROMs, RAMs, hard disks, and a driving unit for FDs and CDs. A program for estimating noise generation for the synchronous belt may be installed on the PC, as by inputting the same through removable recording media such as CD ROMs, an FD, or an MO. The hardware and software are combined to allow the described performance of each of the above calculators 48,50,52,54,56. The belt displacement calculator 46 may be set up by installing commercially available finite element system analysis software.

The data generated by each of the calculators 48,50,52, 54,56 can be transmitted to a display 72 and/or printer 74 so as to be conveniently accessible and visible by an operator.

Figure 1:
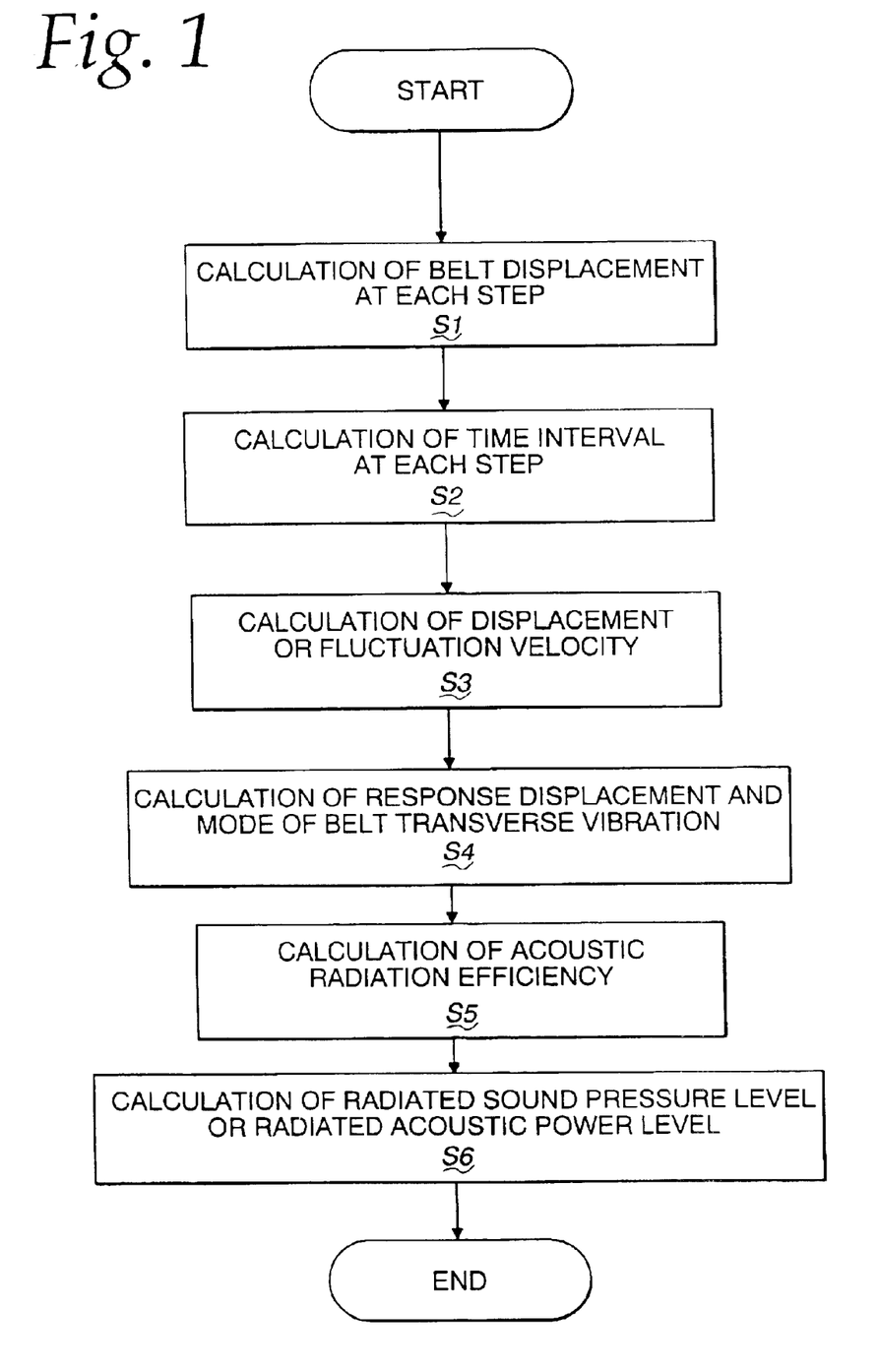
FIG. 1 is a flow chart depicting one method of estimating noise generation for a synchronous belt, according to the present invention.

The method of estimating noise generation for a synchronous belt 12, utilizing the apparatus 44 in FIG. 2, will now be described with reference to FIG. 1. In step 1, as shown at S1, one pitch, or a plurality of pitches, are divided into n steps, with n being a positive integer. At each of the n or (n+1) meshing steps, (a) a change in position along the y axis of a point fixed to the belt progressing through meshing or (b) a change in position of the belt along the y axis relative to an x coordinate fixed near a meshing point, as meshing progresses, is obtained.

In step 2 (S2), an operator of the apparatus 44 inputs from the source 64, which may be a keyboard or the like, the pulley diameter D, a tooth pitch p or number of pulley teeth z of the driving pulley 14, the number of revolutions N of the drive pulley 14, and any other parameter in the system 10, necessary to calculate a time interval $\Delta t$(sec) for a single step n.

At step 3 (S3), by using the displacement along the y axis ($\Delta y$) obtained in step one, and the time interval $\Delta t$ obtained in step 2, a displacement $\Delta y$ along the y axis for the belt for each time step or velocity in the y direction ($v=\Delta y/\Delta t$) for each time step is obtained as a function of time. By carrying out Fourier transformation, the displacement $\Delta y$ or the velocity in the y direction can be obtained alternatively as a function of frequency.

At step 4 (S4), using the displacement $\Delta y$ or the velocity v in the y direction, obtained as a function of time or frequency at step 3, using a boundary condition (exciting force) at the meshing end of the belt span, a response displacement of the belt transverse vibration, or a response velocity and a mode thereof can be obtain.

At step 5 (S5), using the frequency of the exciting force and the response mode of the belt transverse vibration obtained at step 4, an acoustic radiation efficiency is calculated.

Additionally at step 6 (S6), by using velocity and the mode of the belt transverse vibration obtained at step 4, and the acoustic radiation efficiency obtained at step 5, a radiated acoustic power level or a radiated sound pressure level can be calculated and outputted.

Practicing the invention utilizing the finite element system analysis, belt displacement at or near the meshing location 40 can be calculated. Using this calculation, an exciting force is determined to generate a transverse vibration model. The exciting force is applied to the transverse vibration model to calculate a velocity of transverse vibration. Then an acoustic radiation efficiency of the synchronous belt is calculated to determine a radiated sound pressure level at the surface of the belt 12.

Figure 4:
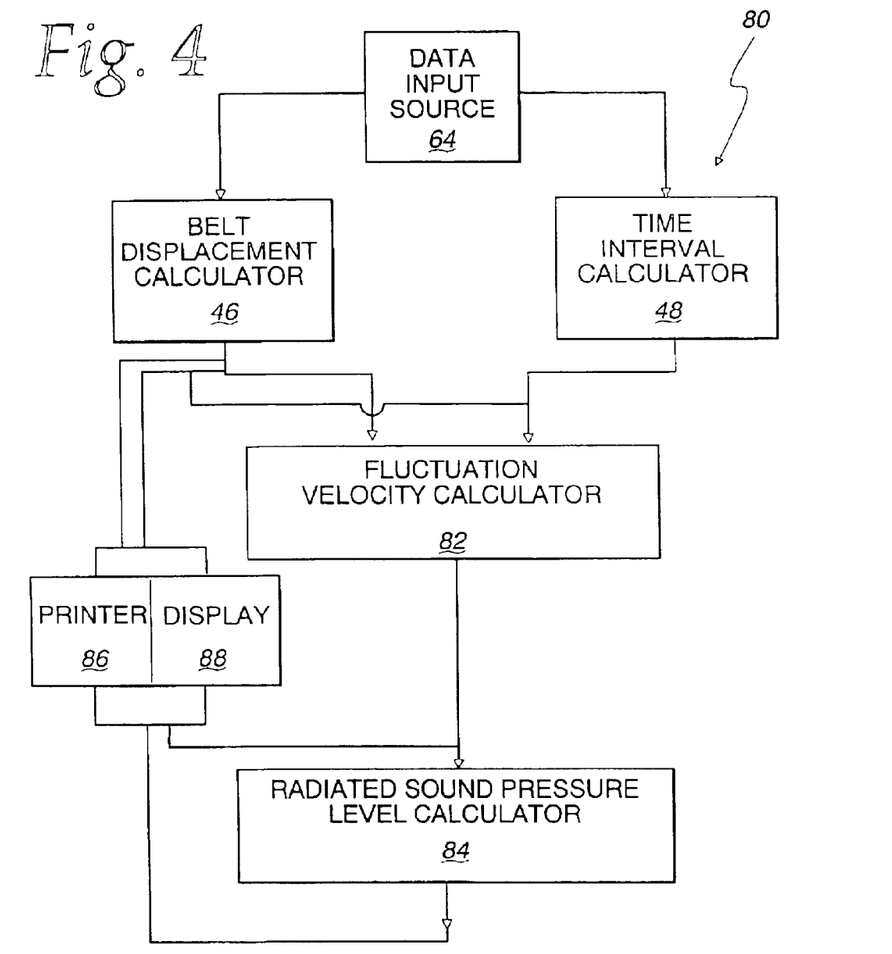
FIG. 4 is a schematic representation of an apparatus through which the method of FIG. 3 can be carried out.

Another apparatus for estimating noise generation for a synchronous belt, according to the present invention, is shown at 80 in FIG. 4. The apparatus 80 incorporates the same belt displacement calculator 46 and time interval calculator 48 as the apparatus 44, previously described. Additionally, the apparatus 80 has a fluctuation velocity calculator 82 and a radiated sound pressure level calculator 84.

The belt displacement calculator 46 inputs a belt displacement $\Delta y$ and the time interval calculator 48 inputs a time interval $\Delta t$ for one step to the fluctuation velocity calculator 82, which calculates fluctuation velocity v ($v=\Delta y/\Delta t$).

The radiated sound pressure level calculator 84 calculates a radiated sound pressure level using the following formula and the value of the fluctuation velocity (v) obtained by the fluctuation velocity calculator 82 at the meshing location 40.

Radiated sound pressure level:

$$L_P = L_v + K$$

where:

$$L_v = 10\log(v_e/5 \times 10^{-8})^2,$$

$v_e$ is an effective value of the fluctuation velocity, and

K is a constant obtained experimentally, empirically, or otherwise.

The data generated by the calculators 46,48,82,84 is outputted, as to a printer 86 and/or display 88, for detection and monitoring by the system operator.

The apparatus 80 may likewise be a general purpose personal computer (PC), as previously described. The hardware and software are combined to allow performance of the calculators 46,48,82,84, as previously described. Commercially available finite element system analysis software may be loaded into the computer 80 so that the hardware and software allow the belt displacement calculator 46 to perform as described above.

Figure 3:
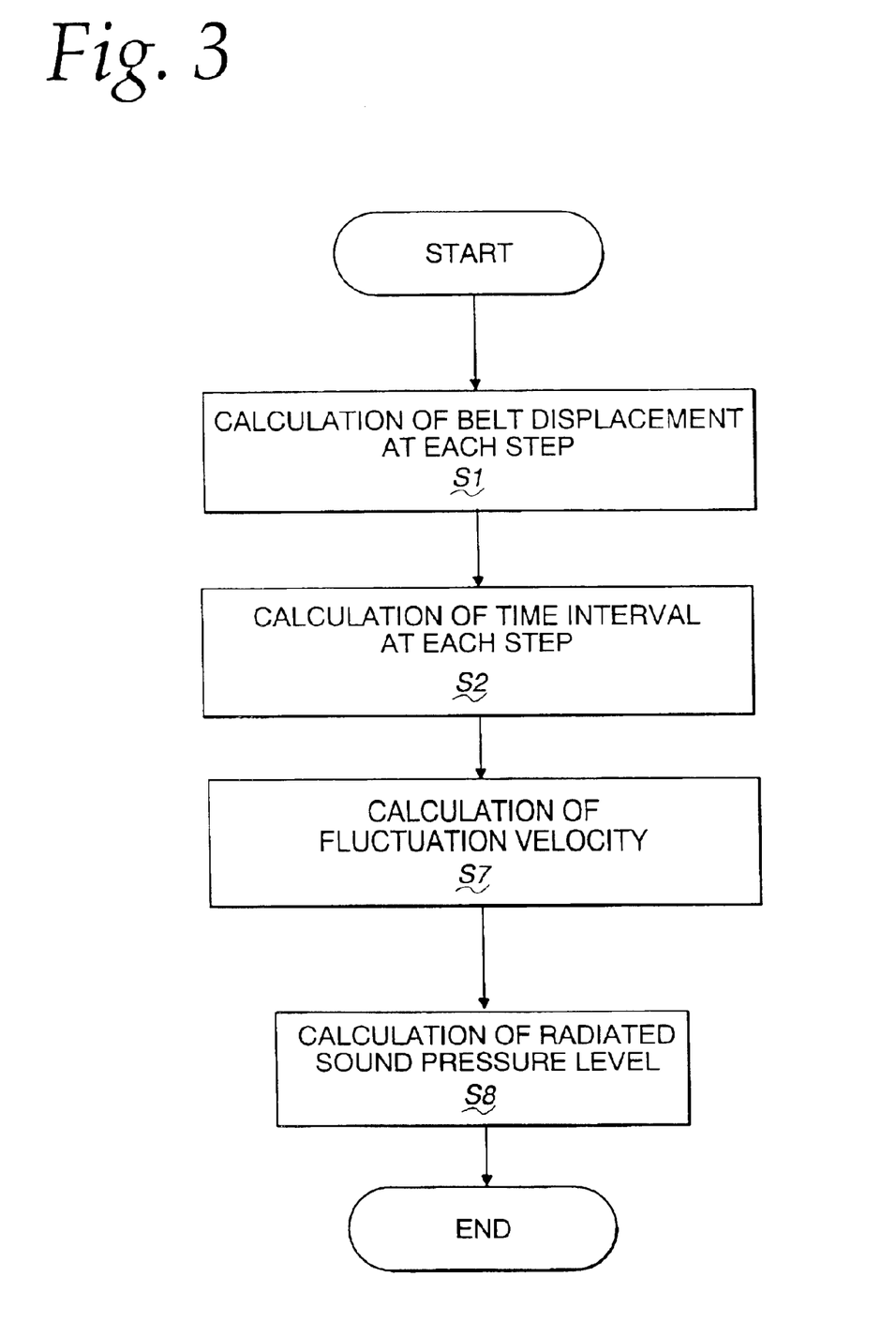
FIG. 3 is a flow diagram showing another method of estimating noise generation for a synchronous belt, according to the present invention.

A method for estimating noise generator for a synchronous belt, utilizing the apparatus 80 in FIG. 4, is described with respect to the flow chart in FIG. 3. The steps 1 and 2 (S1 and S2) correspond to those previously described with respect to the apparatus/computer 44.

At step 7 (S7), using the displacement $\Delta y$ along the y axis obtained at step 1, and the time interval $\Delta t$ obtained at step 2, fluctuation velocity v ($v=\Delta y/\Delta t$) for the belt for each time step is obtained as a function of time.

At step 8 (S8), a radiated sound pressure level is calculated using the fluctuation velocity (v) obtained at step 7 (S7) and outputted.

Using the apparatus/computer 80 in FIG. 4 in the manner shown in FIG. 3, by using the finite element system analysis, noise generation for a synchronous belt can be estimated at a location at or near the meshing location 40. Using the displacement data, radiated sound pressure level on the surface of belt can be calculated. When belts sizes, i.e., lengths and widths, and material properties of belts, i.e., masses per unit length and resistance to tension, are approximately the same, and vibrational frequencies are the same, responses of the belts are approximately proportional to an exciting force, which can be utilized effectively in estimating change in noise generated due to change in shape of tooth profile, and the like.

Figure 9:
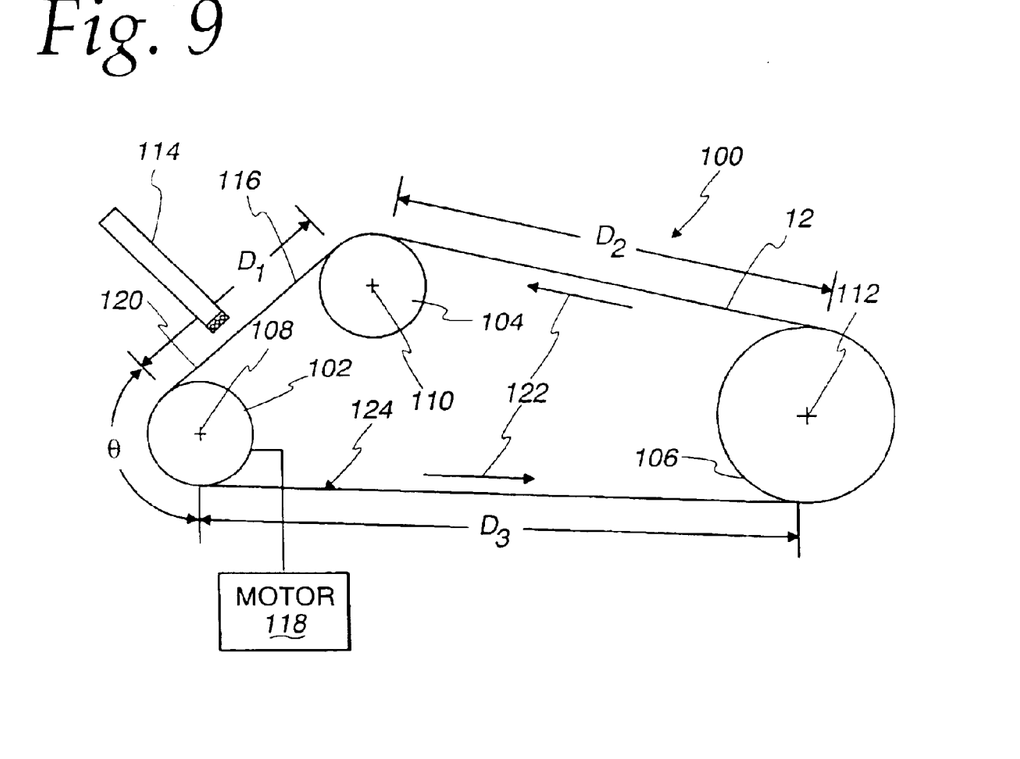
FIG. 9 is a schematic representation of a testing system for measuring noise generated by a synchronous belt trained around three toothed pulleys.

The effectiveness of the present invention will now be demonstrated, using a testing setup 100, as shown in FIG. 9. In FIG. 9, a synchronous belt 12 was trained around a drive pulley 102, an idler pulley 104, and a driven pulley 106, each having teeth spaced uniformly around the circumference thereof. The pulleys 102,104,106 were rotatable around spaced, parallel axes 108,110,112, consecutively. The distance D1 between the axes 108,110 was 104 millimeters. The distance D2 between the axes 110,112 was 300 millimeters. The distance D3 between the axes 108,112 was 440 millimeters. The contact angle θ for the drive pulley 102 was 148. Between the drive and idler pulleys 102,104, a microphone 114 was positioned to as to measure actual noise generation at the outer surface 116 of the belt 12.

A drive motor 118 for the drive pulley 102 was situated outside of a measuring room within which the remainder of the testing setup 100 was located. The driven pulley 106 was repositioned to apply a desired tension on the belt 12. The load was set to a desired value by a load suspension device coupled to the shaft of the driven pulley 112.

The belt 12 was designed with a pitch of 8 millimeters between adjacent teeth. The belt had a 19 millimeter width. The drive pulley 102 had 24 teeth with a tooth pitch of 8 millimeters. 43.5 Kgf tension was applied to the tension portion of the belt 12 at 120, with the belt moving in the direction of the arrows 122. The slackened portion 124 downstream of the drive pulley 102 was tensioned to 19.6 Kgf. The effective tension was 23.9 Kgf. The drive pulley 102 was operated at 780 rpm.

Using the inventive method and apparatus, the tooth height and tooth width for each belt and pulley tested were changed by degrees. The tests were carried out using eight different combinations of tooth height and width. Analysis by the finite element system analysis method was employed.

Figure 10:
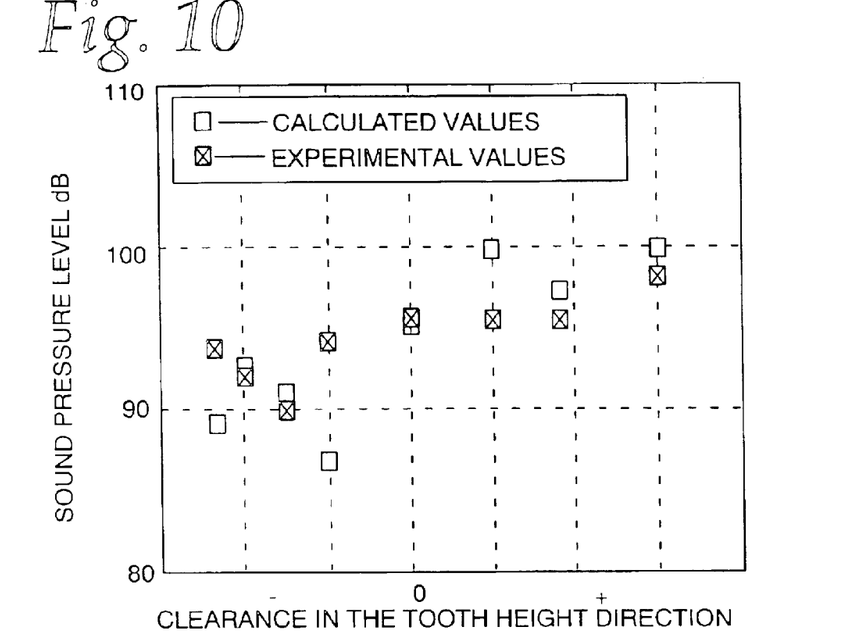
FIG. 10 is a graphical representation comparing calculated and actual sound pressure levels based on clearance along the tooth height direction.
Figure 11:
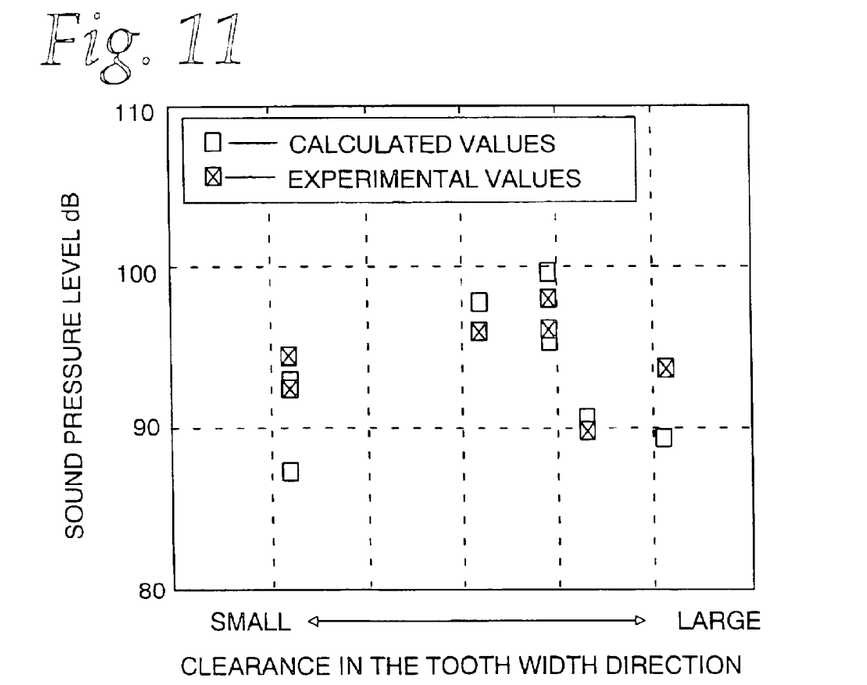
FIG. 11 is a graphical representation comparing calculated and actual sound pressure levels based on clearance along the tooth width direction.

A comparison between noise values calculated or estimated according to the present invention, and those resulting from actual measurements, i.e., experimental values using the microphone 114, is shown in FIGS. 10 and 11. FIG. 10 shows radiated sounds plotted with a clearance along the tooth height taken on the horizontal axis. A "+" sign represents clearance with a "−" sign representing compression. FIG. 11 depicts radiated sounds plotted with a clearance in a direction of the tooth width (backlash), taken along the horizontal axis. For the radiated sound, a sound pressure level at a meshing frequency of the synchronous belt was used.

From these graphs, it can be seen that the sound values estimated/calculated according to the present invention and the actual experimental measurement values, while recognized to be scattered, are accurate on the order of two to three dB on average so as to be approximately in agreement. As such, it is apparent that the method of estimating noise according to the invention is reliable and a practical method for noise generation estimation.

In a synchronous belt system, it is recognized that noise is radiated by a transverse vibration of the belt due to the belt displacement caused as meshing occurs. With this knowledge, the invention permits the generated noise of the synchronous belt to estimated in advance, thereby making it possible to reduce noise and to contribute to a better operating environment for synchronous belt systems. Further, by making a preliminary estimation of generated noise, the need for conducting tests to accomplish the same is obviated. This avoids the requirement for multiple samples and simplifies testing in terms of both time and materials.

While the invention has been described with particular reference to the drawings, it should be understood that various modifications could be made without departing from the spirit and scope of the present invention.

What is claimed is:

1. A method of estimating noise generation for a synchronous belt having a length and teeth spaced along the belt length, the method comprising the steps of:

calculating belt displacement transversely to the belt length at or near a first location at which teeth on the belt mesh with teeth on a first cooperating toothed pulley;

calculating a belt fluctuation velocity by correlating the belt displacement to a time frame; and calculating a radiated sound pressure level using the calculated belt fluctuation velocity.

2. The method of estimating noise generation for a synchronous belt according to claim 1 wherein the step of calculating belt displacement comprises calculating belt displacement in a span between the first cooperating toothed pulley and a second toothed pulley spaced from the first cooperating toothed pulley and with which the belt cooperates.

3. The method of estimating noise generation for a synchronous belt according to claim 2 wherein the step of calculating belt displacement comprises calculating belt displacement substantially perpendicular to the length of the belt.

4. The method of estimating noise generation for a synchronous belt according to claim 3 wherein the step of calculating a belt fluctuation velocity comprises calculating a belt fluctuation velocity using at least one of (a) number of revolutions of the first cooperating toothed pulley, (b) number of teeth on the first cooperating toothed pulley, (c) pitch of the teeth on the first cooperating toothed pulley, (d) diameter of the first cooperating toothed pulley, and (e) another parameter of the belt or a system with which the belt cooperates.

5. The method of estimating noise generation for a synchronous belt according to claim 4 wherein the step of calculating belt displacement comprises calculating belt displacement using a finite element system analysis.

6. The method of estimating noise generation for a synchronous belt according to claim 5 wherein the step of using a finite element system analysis comprises performing a calculation to determine belt displacement based on displacement of a fixed point on the belt substantially perpendicular to the belt length as a portion of the belt at the fixed point moves towards and into a meshing state at the first location.

7. A method of estimating noise generation for a synchronous belt having a length and teeth spaced along the belt length, the method comprising the steps of:

calculating belt displacement transversely to the belt length at or near a first location at which teeth on the belt mesh with teeth on a first cooperating toothed pulley;

calculating a belt displacement/fluctuation velocity by correlating the belt displacement to a time frame or frequency;

calculating a response displacement or a mode of a belt transverse vibration or a velocity of the belt transverse vibration using the belt displacement/fluctuation velocity taken as a vibrational force at or near the first location;

calculating an acoustic radiation efficiency from the calculated response displacement or mode of belt transverse vibration; and calculating a radiated sound pressure level or a radiated acoustic power level from the velocity of the belt transverse vibration and the acoustic radiation efficiency.

8. The method of estimating noise generation for a synchronous belt according to claim 7 wherein the step of calculating belt displacement comprises calculating belt displacement in a span between the first cooperating toothed pulley and a second toothed pulley spaced from the first cooperating toothed pulley and with which the belt cooperates.

9. The method of estimating noise generation for a synchronous belt according to claim 8 wherein the step of calculating belt displacement comprises calculating belt displacement substantially perpendicular to the length of the belt.

10. The method of estimating noise generation for a synchronous belt according to claim 9 wherein the step of calculating a belt displacement/fluctuation velocity comprises calculating a belt displacement/fluctuation velocity using at least one of (a) number of revolutions of the first cooperating toothed pulley, (b) number of teeth on the first cooperating toothed pulley, (c) pitch of the teeth on the first cooperating toothed pulley, (d) diameter of the first cooperating toothed pulley, and (e) another parameter of the belt or a system with which the belt cooperates.

11. The method of estimating noise generation for a synchronous belt according to claim 10 wherein the step of calculating belt displacement comprises calculating belt displacement using a finite element system analysis.

12. The method of estimating noise generation for a synchronous belt according to claim 11 wherein the step of using a finite element system analysis comprises performing a calculation to determine belt displacement based on displacement of a fixed point on the belt substantially perpendicular to the belt length as a portion of the belt at the fixed point moves towards and into a meshing state at the first location.

13. A method of estimating noise generation for a synchronous belt having a length and teeth spaced along the belt length such that as the belt is advanced, the belt teeth move toward teeth on a cooperating toothed pulley and then into a meshing state, the belt teeth following movement of the pulley teeth in the meshing state and thereafter assuming an unmeshing state wherein the belt teeth disengage from the pulley teeth, the method comprising the steps of:

calculating a radiated sound pressure level using data derived from interaction of the belt teeth with the cooperating toothed pulley at or near a location at which the teeth on the belt move towards and into the meshing state with the teeth on the cooperating toothed pulley, wherein the step of calculating a radiated sound pressure level comprises calculating a radiated sound pressure level using data derived based upon displacement of the belt transversely to the length of the belt at or near the location at which the teeth on the belt mesh with teeth on the cooperating toothed pulley.

14. An apparatus for estimating noise generation for a synchronous belt having a length and teeth spaced along the belt length, the apparatus comprising:

a belt displacement calculator, the belt displacement calculator capable of calculating displacement transverse to the belt length along a span of the belt between which the belt is engaged with first and second cooperating toothed pulleys and at or near a first location at which the teeth on the belt mesh with the first cooperating pulley;

a fluctuation velocity calculator, the fluctuation calculator capable of calculating a belt fluctuation velocity based upon belt displacement over a time frame; and a radiated sound pressure level calculator, the radiated sound pressure level calculator capable of calculating radiated sound pressure level using the calculated fluctuation velocity.

15. The apparatus for estimating noise generation for a synchronous belt according to claim 14 wherein the fluctuation velocity calculator calculates fluctuation velocity using at least one of (a) number of revolutions of the first cooperating toothed pulley, (b) number of teeth on the first cooperating toothed pulley, (c) pitch of the teeth on the first cooperating toothed pulley, (d) diameter of the first cooperating toothed pulley, and (e) another parameter of the belt or a system with which the belt cooperates.

16. The apparatus for estimating noise generation for a synchronous belt according to claim 14 wherein the belt displacement calculator calculates belt displacement using a finite element system analysis.

17. The apparatus for estimating noise generation for a synchronous belt according to claim 16 wherein the finite element system analysis is carried out based on displacement of a fixed point on the belt substantially perpendicular to the belt length as a portion of the belt at the fixed point moves towards and into a meshing state at the first location.

18. An apparatus for estimating noise generation for a synchronous belt having a length and teeth spaced along the belt length, the apparatus comprising:

a belt displacement calculator, the belt displacement calculator capable of calculating displacement transverse to the belt length along a span of the belt between which the belt is engaged with first and second cooperating toothed pulleys and at or near a first location at which the teeth on the belt mesh with the first cooperating pulley;

a displacement/fluctuation velocity calculator, the displacement/fluctuation velocity calculator capable of calculating displacement/fluctuation velocity as a function of time or frequency;

a belt transverse vibration calculator, the belt transverse vibration calculator capable of calculating a response displacement or a mode of belt transverse vibration or a velocity of belt transverse vibration using the calculated displacement/fluctuation velocity taken as a vibrational force at or near the first location;

an acoustic radiation efficiency calculator, the acoustic radiation efficiency calculator capable of calculating an acoustic radiation efficiency from the calculated response displacement or mode of belt transverse vibration; and a radiated sound pressure level/radiated acoustic power level calculator, the radiated sound pressure level/radiated acoustic power level calculator capable of calculating a radiated sound pressure level or radiated acoustic power level from the calculated velocity of the belt transverse vibration and acoustic radiation efficiency.

19. The apparatus for estimating noise generation for a synchronous belt according to claim 18 wherein the displacement/fluctuation velocity calculator calculates displacement/fluctuation velocity using at least one of (a) number of revolutions of the first cooperating toothed pulley, (b) number of teeth on the first cooperating toothed pulley, (c) pitch of the teeth on the first cooperating toothed pulley, (d) diameter of the first cooperating toothed pulley, and (e) another parameter of the belt or a system with which the belt cooperates.

20. The apparatus for estimating noise generation for a synchronous belt according to claim 18 wherein the belt displacement calculator calculates belt displacement using a finite element system analysis.

21. The apparatus for estimating noise generation for a synchronous belt according to claim 20 wherein the finite element system analysis is carried out based on displacement of a fixed point on the belt substantially perpendicular to the belt length as a portion of the belt at the fixed point moves towards and into a meshing state at the first location.

22. A program for estimating noise generation for a synchronous belt having a length and teeth spaced along the belt length, the program comprising:

first program means for calculating displacement transverse to the belt length along a span of the belt between which the belt is engaged with first and second cooperating toothed pulleys and at or near a first location at which the teeth on the belt mesh with the first cooperating pulley;

second program means for calculating a belt fluctuation velocity based upon belt displacement over a time frame; and third program means for calculating the radiated sound pressure level using the calculated fluctuation velocity.

23. The program for estimating noise generation for a synchronous belt according to claim 22 wherein the second programming means comprises means for calculating fluctuation velocity using at least one of (a) number of revolutions of the first cooperating toothed pulley, (b) number of teeth on the first cooperating toothed pulley, (c) pitch of the teeth on the first cooperating toothed pulley, (d) diameter of the first cooperating toothed pulley, and (e) another parameter of the belt or a system with which the belt cooperates.

24. The program for estimating noise generation for a synchronous belt according to claim 22 where the first program means comprises means for calculating belt displacement using a finite element system analysis.

25. The program for estimating noise generation for a synchronous belt according to claim 24 wherein the finite element system analysis is carried out based on displacement of a fixed point on the belt substantially perpendicular to the belt length as a portion of the belt at the fixed point moves towards and into a meshing state at the first location.

26. A program for estimating noise generation for a synchronous belt having a length and teeth spaced along the belt length, the program comprising:

first program means for calculating displacement transverse to the belt length along a span of the belt between which the belt is engaged with first and second cooperating toothed pulleys and at or near a first location at which the teeth on the belt mesh with the first cooperating pulley;

second program means for calculating a displacement/fluctuation velocity as a function of time or frequency;

third program means for calculating a response displacement or a mode of belt transverse vibration or a velocity of belt transverse vibration using the calculated displacement/fluctuation velocity taken as a vibrational force at or near the first location;

fourth program means for calculating an acoustic radiation efficiency from the calculated response displacement or mode of belt transverse vibration; and fifth program means for calculating a radiated sound pressure level or radiated acoustic power level from the calculated velocity of the belt transverse vibration and acoustic radiation efficiency.

27. The program for estimating noise generation for a synchronous belt according to claim 26 wherein the second program means comprises means for calculating displacement/fluctuation velocity using at least one of (a) number of revolutions of the first cooperating toothed pulley, (b) number of teeth on the first cooperating toothed pulley, (c) pitch of the teeth on the first cooperating toothed pulley, (d) diameter of the first cooperating toothed pulley, and (e) another parameter of the belt or a system with which the belt cooperates.

28. The program for estimating noise generation for a synchronous belt according to claim 26 where the first program means comprises means for calculating belt displacement using a finite element system analysis.

29. The program for estimating noise generation for a synchronous belt according to claim 28 wherein the finite element system analysis is carried out based on displacement of a fixed point on the belt substantially perpendicular to the belt length as a portion of the belt at the fixed point moves towards and into a meshing state at the first location.

* * * * *